C. K. NELSON.
CONFECTION.
APPLICATION FILED DEC. 23, 1921.
1,404,539.
Patented Jan. 24, 1922.
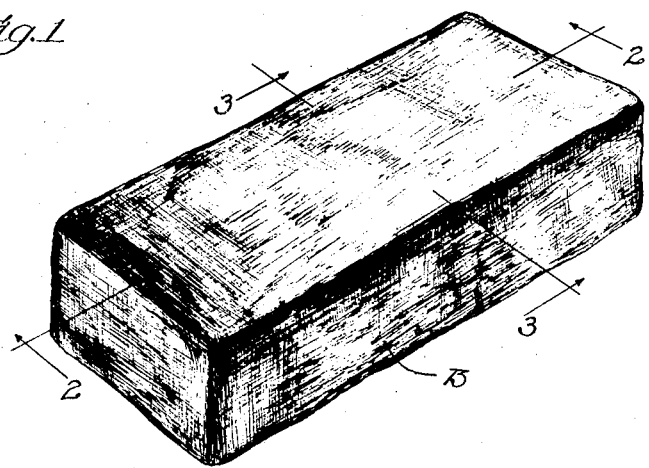
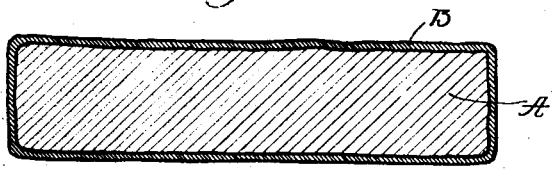
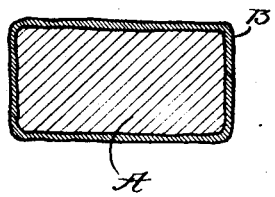
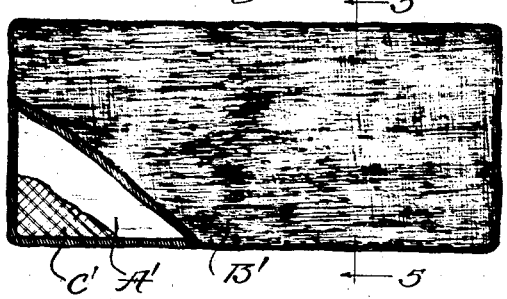
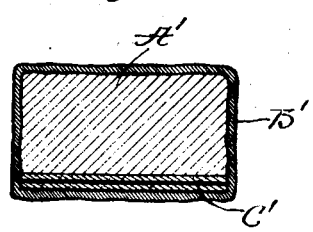
Inventor:
C. K. Nelson
By Mason Fenwick Lawrence, Attys.

UNITED STATES PATENT OFFICE.

CHRISTIAN K. NELSON, OF ONAWA, IOWA, ASSIGNOR OF ONE-HALF TO RUSSELL STOVER, OF CHICAGO, ILLINOIS.

CONFECTION.

1,404,539.      Specification of Letters Patent.      Patented Jan. 24, 1922.

Application filed December 23, 1921. Serial No. 524,529.

*To all whom it may concern:*

Be it known that CHRISTIAN K. NELSON, a citizen of the United States, residing at Onawa, in the county of Monona and State of Iowa, has invented certain new and useful Improvements in Confections; and he does hereby declare the following to be a full, clear, and exact description of the invention, such as will enable others skilled in the art to which it appertains to make and use the same.

The present invention relates to confectionery and has for its object the production of a commercially practical coated brick or block of ice cream or the like.

It is the primary object of the invention to provide a frozen dainty comprising a form retaining block or brick of ice cream or the like, also to provide an encasement therefor which facilitates its ready handling.

Additionally it is my object to provide a confection comprising a normally liquid center and an enclosing member of such shape as will be adapted to provide a receptacle for the center during its consumption as food or refreshment.

A further object of the invention is to provide an edible encasing member of predetermined form for congealed confections.

These and such other objects as may hereinafter appear are attained by the combination, arrangement and formation of the confection as illustrated in the accompanying drawing, in which:—

Figure 1 is a perspective view of the confection;

Figures 2 and 3 are longitudinal and transverse sections thereof;

Figure 4 is a top view of a modified form of the confection, part of the encasement and core being broken away, and Figure 5 is a vertical section of the form shown in Figure 4.

Like reference characters are used to designate similar parts in the several views in the drawing.

The article comprises, in its simplest form, a block or brick or frozen confection encased or contained within an edible container or shell. The core or center may be an ice cream, sherbet, sorbet, ice, or other material congealed by refrigeration.

It is well known that ice cream and the like are sold in brick or block form. My invention comprises a core consisting of a block or brick of ice cream, of general rectangular configuration and of a more elongated form than is usually found in so-called individual bricks, as is indicated in Figure 1, such core being designated in Figures 2 and 3 by the letter A. This core A is contained and sealed within a shell, wall of coating B, of edible material which may be like that employed in coating chocolate candies, although preferably modified to harden at a lower temperature.

Such edible material is of a thickness and consistency adapting it to retain its shape and form at ordinary temperatures, but is not so brittle, when hard, that it will crack when the teeth or a sharp instrument passes therethrough. The shell B surrounds the core A sustaining the latter and preventing it from spilling in the event of liquefaction. Additionally, it provides a convenient means for holding the core during its handling and consumption and prevents collapse of the confection.

In Figures 4 and 5 a modified form of my confection is illustrated. The base or bottom C' may be preformed, as, for example, a Nabisco wafer or a flat and thin chocolate slab. Upon this is disposed a brick or block of congealed confection material A', and the whole is then surrounded with confection material, B', adapted to retain its shape at ordinary temperatures. One or more sides may be preformed as desired. This embodiment of my invention is particularly adapted for use with enrobing machines, facilitating the "bottoming" step in the process of forming a shell or encasement for the core A'.

This application is a continuation in part of my prior application Serial No. 485,593 filed July 18, 1921.

Having thus described my invention, what I claim as new and desire to secure by Letters-Patent of the United States, is:—

1. A confection comprising a core of normally liquid material frozen to a substantially solid state and sealed within an edible, sustaining and form retaining casing adapted to maintain the confection in its original form during handling.

2. A confection comprising a core of normally liquid material frozen to a substantially solid state and sealed within a sustaining and form maintaining casing of hardened chocolate adapted to maintain the confection in its original form during handling.

3. A confection comprising a core of normally liquid material frozen to a substantially solid state and sealed within an edible, sustaining and form retaining casing of bar-like contour adapted to maintain the confection in its original form during handling.

4. A confection comprising a core of a confection ice frozen to a substantially solid state and sealed with an edible, sustaining and form retaining casing of bar-like contour adapted to maintain the confection in its original form during handling.

5. A confection comprising a core of ice cream frozen to a substantially solid state and sealed within a casing of hardened chocolate of such thickness and consistency as to maintain the confection in its original form during handling.

6. A confection comprising a core of normally liquid material frozen to a substantially solid state, and a hardened edible coating completely enclosing the core, the whole forming a substantially rectangular solid adapted to maintain its original form during handling.

7. A confection comprising a core of normally liquid material frozen to a substantially solid state, a rectangular base therefor, and a casing of relatively hard edible material adhering to said base and with said base completely enclosing said frozen core and retaining it in its original form.

In testimony whereof I affix my signature.

CHRISTIAN K. NELSON.